United States Patent
Nilsson

(10) Patent No.: US 11,133,855 B2
(45) Date of Patent: Sep. 28, 2021

(54) UPLINK BEAM MANAGEMENT

(71) Applicant: Telefonaktiebolaget LM Ericsson (publ), Stockholm (SE)

(72) Inventor: Andreas Nilsson, Gothenburg (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 39 days.

(21) Appl. No.: 16/557,272

(22) Filed: Aug. 30, 2019

(65) Prior Publication Data
US 2021/0067226 A1  Mar. 4, 2021

(51) Int. Cl.
| | |
|---|---|
| H04B 7/06 | (2006.01) |
| H04L 5/00 | (2006.01) |
| H04L 25/02 | (2006.01) |
| H04W 52/34 | (2009.01) |

(52) U.S. Cl.
CPC ......... H04B 7/0695 (2013.01); H04L 5/0051 (2013.01); H04L 25/0226 (2013.01); H04W 52/34 (2013.01)

(58) Field of Classification Search
CPC .... H04B 7/0695; H04B 7/0617; H04B 7/088; H04B 7/0404; H04B 7/0408; H04B 1/3838; H04B 17/309; H04B 17/102; H04B 17/318; H04W 52/146; H04W 52/367; H04W 52/365; H04W 52/325; H04W 52/34; H04W 72/0413; H04W 72/0473; H04L 5/0051; H04L 25/0226
See application file for complete search history.

(56) References Cited

U.S. PATENT DOCUMENTS

| | | | |
|---|---|---|---|
| 2019/0141692 A1 | 5/2019 | Subramanian et al. | |
| 2019/0306850 A1* | 10/2019 | Zhang | H04B 7/0639 |
| 2020/0107279 A1* | 4/2020 | Sun | H04W 52/346 |
| 2020/0145079 A1* | 5/2020 | Marinier | H04B 7/0456 |

FOREIGN PATENT DOCUMENTS

| | | |
|---|---|---|
| WO | 2017/196612 A1 | 11/2017 |
| WO | 2020/164723 A1 | 8/2020 |

OTHER PUBLICATIONS

International Search Report and Written Opinion issued in International Application No. PCT/EP2020/072616 dated Dec. 7, 2020 (19 pages).

* cited by examiner

*Primary Examiner* — Elton Williams
(74) *Attorney, Agent, or Firm* — Rothwell, Figg, Ernst & Manbeck, P.C.

(57) ABSTRACT

A method for assisting uplink (UL) beam management in a user equipment (UE) is provided. The method includes evaluating a measure of a reduction in maximum allowed power for a first set of candidate beams for UL beam management; determining a second set of candidate beams for UL beam management based at least in part on the evaluating the measure of a reduction in maximum allowed power for the first set of candidate beams; and performing a UL beam management procedure using the second set of candidate beams.

25 Claims, 9 Drawing Sheets

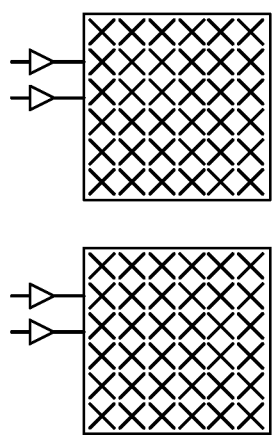 
FIG. 2A
Prior Art
FIG. 2B
Prior Art

UPLINK BEAM MANAGEMENT

TECHNICAL FIELD

Disclosed are embodiments related to uplink beam management.

BACKGROUND

Narrow beam transmission and reception schemes will be needed at higher frequencies to compensate for the high propagation loss at those frequencies. For a given communication link, a beam can be applied at both the transmission reception point (TRP) and the user equipment (UE). The pair of transmission (TX) and reception (RX) beams applied at both the TRP and UE is usually referred to as a beam pair link (BPL). The task of the beam management procedure is to discover and maintain BPLs.

In the example of FIG. 1, system 100 includes a TRP 102, a UE 104, and an obstruction 106. TRP 102 includes six beams 110-120, and UE 106 includes one beam 122. As illustrated by the dashed line between TRP beam 116 and UE beam 122, one BPL 130 has been discovered and is being maintained by the network in this example. A BPL (i.e. both the TRP beam and UE beam), such as BPL 130, is expected to mainly be discovered and monitored by the network using measurements on downlink reference signals used for beam management. Examples of such downlink reference signals include channel state information (CSI) reference signals (RSs) (CSI-RSs) or Syncrhonization Signal Block (SSB), which has been agreed in 3GPP as a beam reference signal for New Radio (NR). The CSI-RS for beam management can be transmitted periodically, semi-persistently, or aperiodic (event triggered) and they can either be shared between multiple UEs or be UE-specific.

In order to find a suitable TRP beam, the TRP transmits CSI-RS in different TRP TX beams on which the UE performs reference signal received power (RSRP) measurements and reports back the N-best TRP TX beams (where N can be configured by the network). Furthermore, the CSI-RS transmission on a given TRP beam can be repeated to allow the UE to evaluate suitable UE beams (UE RX beam training). Which RX beam the UE chooses will likely be agnostic to the TRP in NR, such that there is no need for the UE to signal back to the TRP which UE beam it chooses.

There are basically three different implementations of beamforming, both at the TRP and at the UE: analog beamforming, digital beamforming, and hybrid beamforming. Each implementation has its pros and cons. Digital beamforming is the most flexible solution, but also the costliest due to the large number of required radios and baseband chains. Analog beamforming is the least flexible, but cheaper to manufacture due to the reduced number of radio and baseband chains. Hybrid beamforming is a compromise between analog and digital beamforming. One example of an analog/hybrid beamforming antenna architecture is antenna panels, which has been agreed to be studied for NR access technology in 5G.

In some instances, a panel is a rectangular antenna array of dual-polarized elements with typically one transmit/receive unit (TXRU) per polarization. An analog distribution network with phase shifters can be used to steer the beam of each panel. Multiple panels can be stacked next to each other and digital beamforming can be performed across the panels. FIGS. 2A and 2B illustrate two examples with two panels each, where each panel is connected to one TXRU per polarization. In FIG. 2A, there are two two-dimensional panels and in FIG. 2B there are two one-dimensional panels.

Some UEs might have analog beamformers without beam correspondence, which may mean that downlink (DL)/uplink (UL) reciprocity cannot be used to determine the beams for these beamformers. For such UEs, the UE beam used for UL cannot be derived from beam management procedures based on DL reference signals as described above. To handle such UEs, UL beam management has been included in the NR standard specification for release 15. A difference between normal beam management and UL beam management is that UL beam management utilizes UL reference signals instead of DL references signals.

The UL reference signals that have been agreed to be used for UL beam management include Sounding Reference Signals (SRSs). Two UL beam management procedures are supported in NR: U2 and U3. These UL beam management procedures are schematically illustrated in FIG. 3A (U2) and FIG. 3B (U3). The U2 procedure is performed by transmitting a burst of SRS resources in one UE TX beam and letting the TRP evaluate different TRP RX beams. The U3 procedure lets the UE evaluate a suitable UE TX beam by transmitting different SRS resources in different UE TX beams.

UL beam management can also be useful even if UEs have beam correspondence. It is possible that a combined DL beam management and UL beam management procedure requires less overhead and latency compared to only using a DL beam management procedure. It has also been suggested that using UL beam management instead of DL beam management will facilitate the potential for MU-MIMO for base stations with analog panels. See, for example, Application PCT/EP2019/053739, the contents of which is hereby incorporated in its entirety. Hence, it is possible that UL beam management will be the dominating form of beam management in future millimeter (mm)-wave systems.

Considering the safety of mm-wave radiation exposure to the human body, the FCC and other regulatory institutes have defined the maximum permissible exposure (MPE) as the power density in terms of $W/m^2$. To handle this, RAN4 has discussed a parameter called Power Management Maximum Power Reduction (P-MPR), which is a metric that relates how much the UE needs to reduce the output power to meet radio frequency (RF) exposure requirements.

Since transmission at mm-wave frequencies is expected to be directional, the allowed output power for the UE would very likely be different among different candidate UL beams across different UE panels. That means that certain beams, such as ones that may be pointing towards the human body, may have potentially very high required P-MPR while some other beams, such as ones that have a beam pattern that may not coincide with the human body, may have no (or low) P-MPR. For discussion purposes, say that P-MPR can be as high as 18 dB, which means that the UE would need to reduce the output power for that beam by 18 dB from the maximum allowed transmission power.

How the SRS transmission should be performed by the UE is defined in SRS transmission settings, such as SRS-Config, and is signaled to the UE from the TRP with Radio Resource Control (RRC) signaling. The SRS-Config contains a list of SRS-Resources (the list constitutes a "pool" of resources) where each SRS resource contains information describing the physical mapping of the reference signal on the time-frequency grid, time-domain information, sequence IDs, and so on. The SRS-Config also contains a list of SRS resource sets, which contains a list of SRS resources and an associated DCI trigger state. Thus, when a certain DCI state is triggered, it indicates that the SRS resources in the associated set shall be transmitted by the UE.

Each SRS resource set can be associated with one usage: {beamManagement, codebook, nonCodebook, antennaSwitching}.

SRS resources with usage "codebook" are used to sound the different UE antennas and let the base station determine suitable precoders, rank, and modulation and coding scheme (MCS) for coming UL transmissions. How each SRS port is mapped to each UE antenna is up to UE implementation, but it is expected that one SRS port will be transmitted per UE antenna.

SRS resources with usage "nonCodebook" are used to sound different potential precoders by the UE. The UE determines a set of candidate precoders based on reciprocity, transmits one SRS resource per candidate precoder, and the base station can then select which precoders the UE should use for upcoming physical uplink shared channel (PUSCH) transmissions. One UL layer will be transmitted per indicated candidate precoder. How the UE maps the SRS resources to the antenna ports is up to UE implementation and depends on the channel.

SRS resources with usage "antennaSwitching" are used to sound the channel in UL so that the base station can use reciprocity to determine suitable DL precoders. If the UE has the same number of TX and RX chains, the UE shall transmit one SRS port per UE antenna. Which SRS port that is transmitted from which antenna is, however, up to UE implementation.

SRS resources with usage "beamManagement" are typically only applicable for higher frequencies (Frequency Range 2 (FR2)) and are used to find suitable analog beams at the UE, by transmitting different SRS resources in different UE TX beams.

The SRS-Config information element (IE) is used to configure SRS transmissions. The configuration defines a list of SRS-Resources and a list of SRS-ResourceSets. Each resource set defines a set of SRS-Resources. The network triggers the transmission of the set of SRS-Resources using a configured aperiodicSRS-ResourceTrigger (that is carried in physical layer downlink control information, "L1 DCI").

An SRS configuration is provided in 3GPP TS 38.331, Section 6.3.2, and is reproduced below.

```
-- ASN1START
-- TAG-SRS-CONFIG-START
SRS-Config ::=                          SEQUENCE {
    srs-ResourceSetToReleaseList                SEQUENCE (SIZE(1..maxNrofSRS-ResourceSets))
OF SRS-ResourceSetId            OPTIONAL,   -- Need N
    srs-ResourceSetToAddModList   SEQUENCE (SIZE(1..maxNrofSRS-ResourceSets))
OF SRS-ResourceSet              OPTIONAL,   -- Need N
    srs-ResourceToReleaseList                   SEQUENCE (SIZE(1..maxNrofSRS-Resources)) OF
SRS-ResourceId          OPTIONAL,   -- Need N
    srs-ResourceToAddModList                    SEQUENCE (SIZE(1..maxNrofSRS-Resources)) OF
SRS-Resource            OPTIONAL,   -- Need N
    tpc-Accumulation                            ENUMERATED {disabled}
OPTIONAL,   -- Need S
    ...
}
SRS-ResourceSet ::=                     SEQUENCE {
    srs-ResourceSetId                           SRS-ResourceSetId,
    srs-ResourceIdList   SEQUENCE (SIZE(1..maxNrofSRS-ResourcesPerSet)) OF
SRS-ResourceId    OPTIONAL, -- Cond Setup
    resourceType                                CHOICE {
        aperiodic                               SEQUENCE {
            aperiodicSRS-ResourceTrigger        INTEGER (1..maxNrofSRS-TriggerStates-1),
            csi-RS                              NZP-CSI-RS-ResourceId
OPTIONAL,   -- Cond NonCodebook
            slotOffset                          INTEGER (1..32)
OPTIONAL,   -- Need S
            ...,
            [[
            aperiodicSRS-ResourceTriggerList-v1530   SEQUENCE (SIZE(1..maxNrofSRS-
TriggerStates-2))
                                                OF INTEGER (1..maxNrofSRS-TriggerStates-1)
OPTIONAL   -- Need M
            ]]
        },
        semi-persistent                         SEQUENCE {
            associatedCSI-RS                        NZP-CSI-RS-ResourceId
OPTIONAL, -- Cond NonCodebook
            ...
        },
        periodic                                SEQUENCE {
            associatedCSI-RS                        NZP-CSI-RS-ResourceId
OPTIONAL, -- Cond NonCodebook
            ...
        }
    },
    usage                                       ENUMERATED {beamManagement, codebook, nonCodebook,
antennaSwitching},
    alpha                                   Alpha                           OPTIONAL, --
Need S
    p0                                      INTEGER (-202..24)
OPTIONAL, -- Cond Setup
    pathlossReferenceRS                         CHOICE {
        ssb-Index                                   SSB-Index,
```

-continued

```
    csi-RS-Index                    NZP-CSI-RS-ResourceId
                                                    OPTIONAL, -- Need
M
  srs-PowerControlAdjustmentStates      ENUMERATED { sameAsFci2,
separateClosedLoop}                     OPTIONAL, -- Need S
   ...
}
SRS-ResourceSetId ::=             INTEGER (0..maxNrofSRS-ResourceSets-1)
SRS-Resource ::=                  SEQUENCE {
  srs-ResourceId                    SRS-ResourceId,
  nrofSRS-Ports                     ENUMERATED {port1, ports2, ports4},
  ptrs-PortIndex                    ENUMERATED {n0, n1 }
OPTIONAL,   -- Need R
  transmissionComb                  CHOICE {
    n2                              SEQUENCE {
      combOffset-n2                   INTEGER (0..1),
      cyclicShift-n2                  INTEGER (0..7)
    },
    n4                              SEQUENCE {
      combOffset-n4                   INTEGER (0..3),
      cyclicShift-n4                  INTEGER (0..11)
    }
  },
  resourceMapping                   SEQUENCE {
    startPosition                     INTEGER (0..5),
    nrofSymbols                       ENUMERATED {n1, n2, n4},
    repetitionFactor                  ENUMERATED {n1, n2, n4}
  },
  freqDomainPosition                INTEGER (0..67),
  freqDomainShift                   INTEGER (0..268),
  freqHopping                       SEQUENCE {
    c-SRS                             INTEGER (0..63),
    b-SRS                             INTEGER (0..3),
    b-hop                             INTEGER (0..3)
  },
  groupOrSequenccHopping            ENUMERATED { neither, groupHopping,
sequenceHopping },
  resourceType                      CHOICE {
    aperiodic                         SEQUENCE {
       ...
    },
    semi-persistent                   SEQUENCE {
      periodicityAndOffset-sp             SRS-PeriodicityAndOffset,
       ...
    },
    periodic                          SEQUENCE {
      periodicityAndOffset-p              SRS-PeriodicityAndOffset,
       ...
    }
  },
  sequenceId                        INTEGER (0..1023),
  spatialRelationInfo               SRS-SpatialRelationInfo
OPTIONAL, -- Need R
  ...
}
SRS-SpatialRelationInfo ::=       SEQUENCE {
  servingCellId                   ServCellIndex          OPTIONAL,   -- Need S
  referenceSignal                 CHOICE {
    ssb-Index                       SSB-Index,
    csi-RS-Index                    NZP-CSI-RS-ResourceId,
    srs                             SEQUENCE {
      resourceId                      SRS-ResourceId,
      uplinkBWP                       BWP-Id
    }
  }
}
SRS-ResourceId ::=                INTEGER (0..maxNrofSRS-Resources-1)
SRS-PeriodicityAndOffset ::=      CHOICE {
  sl1                             NULL,
  sl2                             INTEGER(0..1),
  sl4                             INTEGER(0..3),
  sl5                             INTEGER(0..4),
  sl8                             INTEGER(0..7),
  sl10                            INTEGER(0..9),
  sl16                            INTEGER(0..15),
  sl20                            INTEGER(0..19),
  sl32                            INTEGER(0..31),
  sl40                            INTEGER(0..39),
  sl64                            INTEGER(0..63),
```

```
        sl80                  INTEGER(0..79),
        sl160                   INTEGER(0..159),
        sl320                   INTEGER(0..319),
        sl640                   INTEGER(0..639),
        sl1280                  INTEGER(0..1279),
        sl2560                  INTEGER(0..2559)
}
-- TAG-SRS-CONFIG-STOP
-- ASN1STOP
```

The output power for SRS is handled by the SRS power control loop, which defines the total output power that the UE should apply for a given SRS transmission. The standard also specifies how the UE should divide the output power between the multiple transmitted SRS ports, in case the triggered SRS resource set consists of multiple SRS ports.

The SRS power scaling is currently specified in 38.213 section 7.3 as: "For SRS, a UE splits a linear value P_(SRS, b,c) (i,q_s,l) of the transmit power P_(SRS,b,c) (i,q_s,l) on active UL BWP b of carrier f of serving cell c equally across the configured antenna ports for SRS."

This means that if the TRP triggers one SRS resource set with multiple SRS ports, the SRS ports in that SRS resource set should be transmitted with the same output power.

SUMMARY

All SRS resources belonging to one SRS resource set used for beam management should be transmitted with the same output power, according to the standard. In case one or a subset of the candidate UE beams is associated with high P-MPR, it will not be possible for the UE to only reduce the output power for the SRS resource transmitted in that beam; rather, the UE will need to reduce the output power for all the SRS resources in that SRS resource set (i.e., also for SRS resources transmitted in other UE TX beams, even if they have low or zero P-MPR). This might lead to a poor SRS resource link budget, which in turn might lead to sub-optimal UE beam selection. A link budget here refers to an accounting of losses and gains e.g., including transmission power. A poor SRS resource link budget may lead to poor channel estimations based on the SRSs.

In some embodiments, the UE may determine the P-MPR for different candidate UE TX beams. In case one or a subset of the UE beams experience a high P-MPR, the UE (in some embodiments) may change the set of candidate UE TX beams used for UL beam management so that these beams are not used anymore. Instead of using a high P-MPR beam, the UE can sound one of the other beams with low P-MPR or zero P-MPR twice, or the UE can design a new set of candidate beams for UL beam management that only contains beams that have low or zero P-MPR.

According to various embodiments, the SRS link budget for UL beam management procedures can be improved, leading to more reliable UE beam selections. Another advantage is that beams with high P-MPR will not be selected by the TRP. The UE may remove beams that have high P-MPR. For example, the UE may remove beams where the UL link budget would not work due to the P-MPR. In this way, the performance in the network may increase, even if the SRS link budget is adequate.

According to a first aspect, a method for assisting uplink (UL) beam management in a user equipment (UE) is provided. The method includes evaluating a measure of a reduction in maximum allowed power for a first set of candidate beams for UL beam management; determining a second set of candidate beams for UL beam management based at least in part on the evaluating the measure of a reduction in maximum allowed power for the first set of candidate beams; and performing a UL beam management procedure using the second set of candidate beams.

In some embodiments, the UE includes a first antenna panel and a second antenna panel, and each beam in both the first and the second set of candidate beams corresponds to the first antenna panel. In some embodiments, the first antenna panel is analog, and may in some embodiments use analog phase shifters to steer the beam. In some embodiments, evaluating the measure of a reduction in maximum allowed power for the first set of candidate beams comprises determining which candidate beams, if any, of the first set of candidate beams are directed toward a human operating the UE. In some embodiments, determining which candidate beams, if any, of the first set of candidate beams are directed toward a human operating the UE is based on one or more of a camera, an orientation and/or position of the UE, and a proximity sensor.

In some embodiments, the evaluating the measure of a reduction in maximum allowed power for the first set of candidate beams comprises establishing an order of candidate beams of the first set of candidate beams with respect to the measure of a reduction in maximum allowed power, and the determining a second set of candidate beams for UL beam management comprises eliminating a first candidate beam from the first set of candidate beams based on the candidate beam having a higher measure of a reduction in maximum allowed power than other candidate beams based on the established order of candidate beams. In some embodiments, the evaluating the measure of a reduction in maximum allowed power for the first set of candidate beams further comprises determining a scalar value representing the measure of a reduction in maximum allowed power for each candidate beam of the first set of candidate beams. In some embodiments, the determining a second set of candidate beams for UL beam management further comprises generating a maximum threshold value for the measure of a reduction in maximum allowed power based on estimating a Sounding Reference Signal (SRS) link budget. In some embodiments, the measure of a reduction in maximum allowed power comprises the Power Management Maximum Power Reduction (P-MPR) measure.

In some embodiments, the method further includes adding a second candidate beam to the second set of candidate beams in response to eliminating the first candidate beam, wherein the second candidate beam is different from each beam in the first set of candidate beams. In some embodiments, the method further includes adding a second candidate beam to the second set of candidate beams in response to eliminating the first candidate beam, wherein the second candidate beam is one of the candidate beams in the first set of candidate beams other than the first candidate beam. In some embodiments, performing a UL beam management procedure using the second set of candidate beams comprises performing one of a U2 procedure and a U3 procedure. In some embodiments, performing a UL beam management procedure using the second set of candidate beams comprises transmitting Sounding Reference Signal (SRS) resources in the second set of candidate beams. In some embodiments, transmitting SRS resources in the second set of candidate beams comprises only one SRS resource per candidate beam in the second set of candidate beams.

According to a second aspect, a method for assisting uplink (UL) beam management in a user equipment (UE) is provided. The method includes evaluating a measure of a reduction in maximum allowed power for a first set of candidate beams for UL beam management; determining that the first set of candidate beams is appropriate to use for UL beam management based at least in part on the evaluating the measure of a reduction in maximum allowed power for the first set of candidate beams and/or based on an estimated SRS link budget; and performing a UL beam management procedure using the first set of candidate beams.

According to a third aspect, a user equipment (UE) is provided. The UE includes a plurality of antennas; a memory; and a processor. The processor is configured to: evaluate a measure of a reduction in maximum allowed power for a first set of candidate beams for UL beam management; determine a second set of candidate beams for UL beam management based at least in part on the evaluating the measure of a reduction in maximum allowed power for the first set of candidate beams; and perform a UL beam management procedure using the second set of candidate beams.

According to a fourth aspect, a user equipment (UE) is provided. The UE includes a plurality of antennas; a memory; and a processor. The processor is configured to: evaluate a measure of a reduction in maximum allowed power for a first set of candidate beams for UL beam management; determine that the first set of candidate beams is appropriate to use for UL beam management based at least in part on the evaluating the measure of a reduction in maximum allowed power for the first set of candidate beams and/or based on an estimated SRS link budget; and perform a UL beam management procedure using the first set of candidate beams.

According to a fifth aspect, a computer program is provided comprising instructions which when executed by processing circuitry causes the processing circuitry to perform the method of any one of the embodiments of the first and second aspects.

According to a sixth aspect, a carrier is provided containing the computer program of the fifth aspect, wherein the carrier is one of an electronic signal, an optical signal, a radio signal, and a computer readable storage medium.

According to a seventh aspect, a UE is provided. The UE is adapted to: evaluate a measure of a reduction in maximum allowed power for a first set of candidate beams for UL beam management; determine a second set of candidate beams for UL beam management based at least in part on the evaluating the measure of a reduction in maximum allowed power for the first set of candidate beams; and perform a UL beam management procedure using the second set of candidate beams.

According to an eighth aspect, a UE is provided. The UE is adapted to: evaluate a measure of a reduction in maximum allowed power for a first set of candidate beams for UL beam management; determine that the first set of candidate beams is appropriate to use for UL beam management based at least in part on the evaluating the measure of a reduction in maximum allowed power for the first set of candidate beams and/or based on an estimated SRS link budget; and perform a UL beam management procedure using the first set of candidate beams.

BRIEF DESCRIPTION OF THE DRAWINGS

The accompanying drawings, which are incorporated herein and form part of the specification, illustrate various embodiments.

FIGS. 2A and 2B illustrate an antenna array.

DETAILED DESCRIPTION

Figure 1:
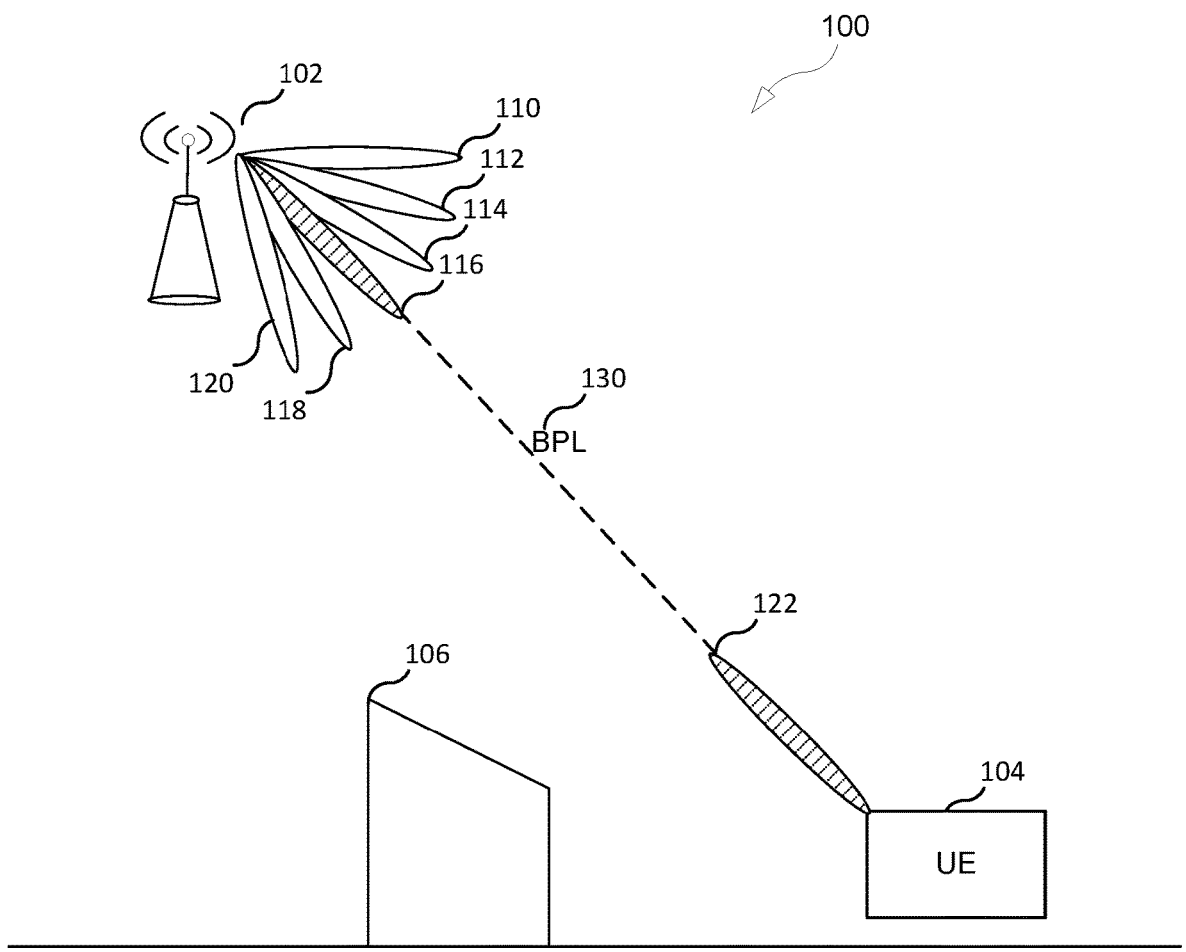
FIG. 1 illustrates a system.
Figure 3A:
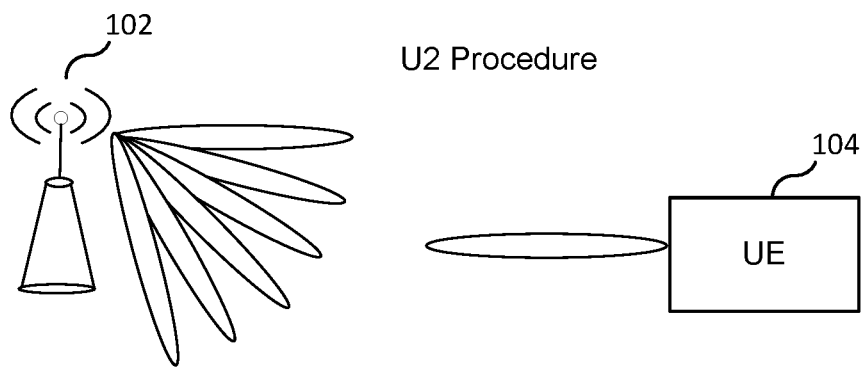
FIGS. 3A and 3B illustrate uplink beam management procedures.
Figure 3B:
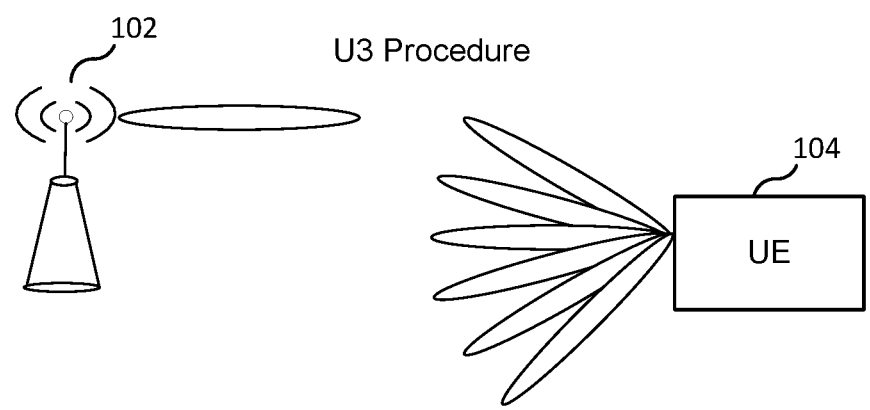
Figure 4:
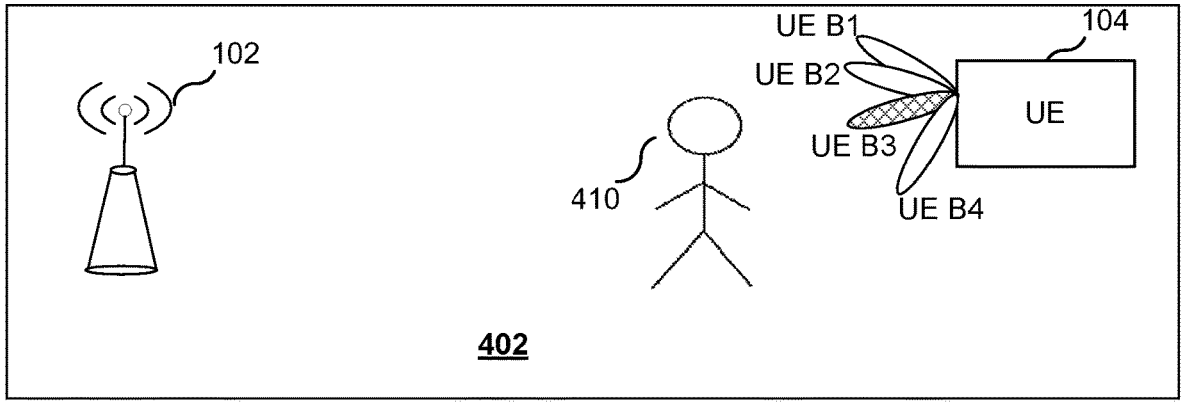
FIG. 4 illustrates a sequence according to an embodiment.
Figure 4:
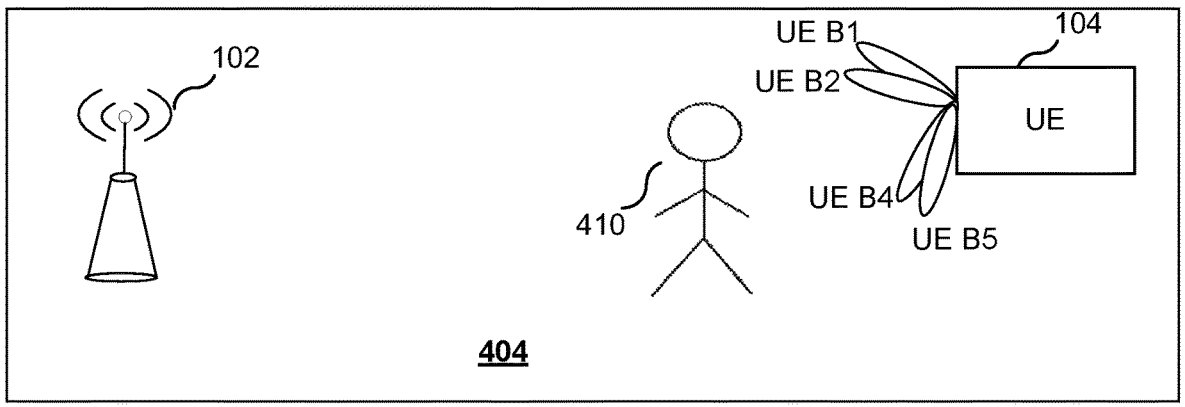
Figure 4:
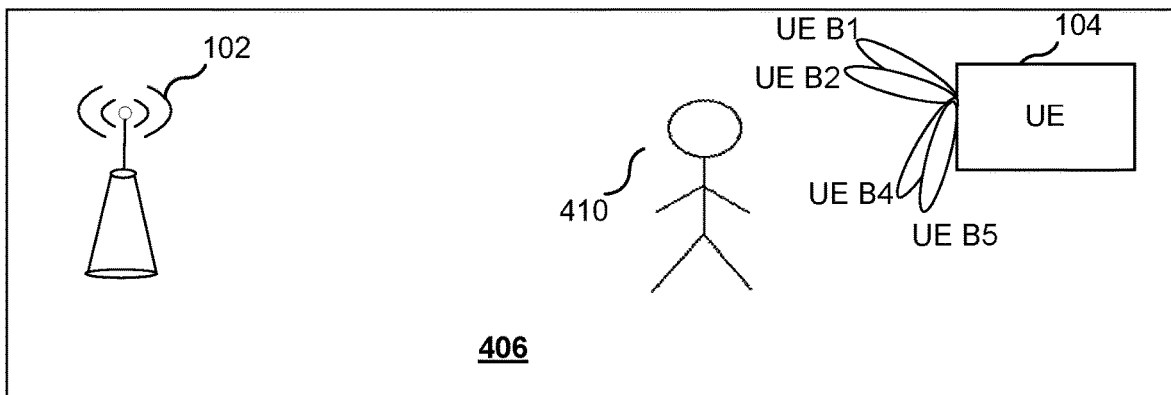

FIG. 4 illustrates an embodiment. As described herein, the UE may use a measure of a reduction in maximum allowed power to perform beam management. An example of such a measure is P-MPR. Other measures are also applicable, including other power management parameters, and wherever P-MPR is discussed herein, another measure may be substituted.

At stage 402, the UE 104 may determine that one or more UE beams should be replaced. For example, the UE 102 may determine the P-MPR associated with one or more UE beams (e.g., UE beams B1, B2, B3, and B4). This may include determining that a particular beam has no P-MPR, low P-MPR, or high P-MPR; alternatively, or in addition, it may also include determining a particular P-MPR value for each UE beam. One way to do this is to determine, for a given UE beam, one or more of (1) whether the beam is pointing towards a human body 410 or not, (2) how close the antenna corresponding to the beam is to the human body, and (3) how strong the antenna gain corresponding to the beam is. For example, if the beam is pointing towards a human body 410, it likely has high P-MPR, whereas if it is not pointing towards a human body 410, it likely has no or low P-MPR. Similarly, the closeness of the antenna to the human body and the strength of the antenna gain may affect the P-MPR.

Determining whether a beam is pointed towards a human body 410 may be done by using a camera at the UE 104, proximity censors, and so forth. In one embodiment, the UE 104 uses a camera to identify in which direction the human body is relative to a position and/or orientation of the UE 104, which allows the UE 104 to determine which candidate UL beams would be transmitted into the human body 410 and to thereby calculate the P-MPR for the different beams. UE 104 may also include other information in its calculation of P-MPR for candidate beams, such as information about the maximum allowed power that UE 104 can transmit. As illustrated in FIG. 4, UE beam B3 points right at the human body 410 and therefore has high P-MPR. In some embodiments, the UE 104 may perform various calculations to determine a P-MPR value for each candidate beam, which may be a scalar value such as an integer or floating point value.

At stage 404, the UE 104 determines an updated set of candidate beams for UL beam management. For example, the UE 104 evaluates which of the candidate UE beams for the UL beam management procedure have a P-MPR that is too high. The UE 104 then determines a new set of candidate UE beams for the UL beam management procedure that do not contain the identified candidate UE TX beams with a P-MPR that is too high. In some embodiments, the beams that have too high a P-MPR are replaced by new beams (not previously in the set of candidate UE beams) and/or other candidate beams (beams from the set of candidate UE beams that do not have too high a P-MPR).

For example, in case the UE 104 only has a number of pre-determined hardcoded UE TX beams that it can apply, it might not be possible for the UE 104 to design a new beam. In that case, the UE 104 may instead sound one of the candidate UE beams with low or zero P-MPR twice (or more). In this case the candidate TRP TX beam set could be UE B1, UE B1, UE B2, and UE B4 (i.e. UE B1 is sounded twice). In FIG. 4, the case where a new beam is chosen is illustrated. As shown, a new beam B5, which points away from the human body, replaces the previous candidate beam B3 which had too high a P-MPR. UE 104 may design the new beam B5 based in part on selecting a direction that points away from the human body and/or selecting a direction that increases the diversity of coverage of the set of Candidate beams. In some embodiments, UE 104 may take into account the estimated P-MPR of the new beam when choosing a new beam to include in the set of candidate beams.

At stage 406, the UE 104 performs the UL beam management procedure by transmitting SRS resources in the new set of candidate UE beams. The UL beam management procedure may include, for example, either the U2 or U3 procedure, or any other appropriate beam management procedure. UE 104 may be in communication with TRP 102 during this procedure.

Figure 5:
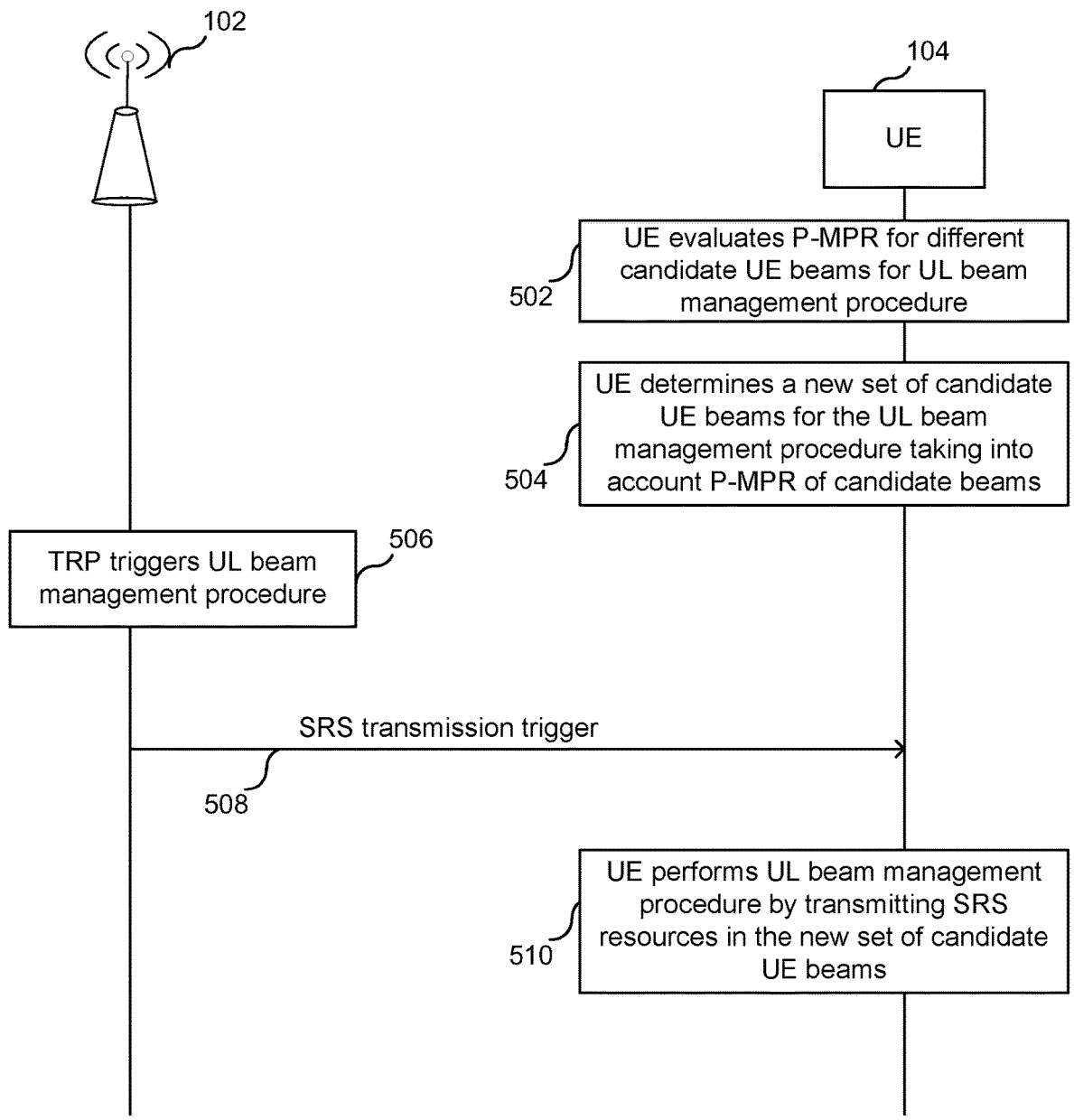
FIG. 5 illustrates a message flow diagram according to an embodiment.

FIG. 5 illustrates a message flow diagram according to an embodiment.

At 502, the UE 104 evaluates the P-MPR associated with different candidate UE beams for UL beam management. As discussed above, this may include, for each UE beam, determining whether the UE beam is pointing towards a human body, which indicates a high P-MPR. As also discussed above, the UE 104 may perform this evaluation by using a camera at the UE, proximity censors, and so on.

In one embodiment, the UE 104 may estimate the SRS link budget (for example, by investigating the SRS power control settings) and set a threshold, based on the link budget, for the maximum allowed P-MPR that a candidate UE beam can have without being removed when designing the new set of candidate UE beams. For example, where the link budget is very large, reducing the SRS transmission power may be less of a concern.

At 504, the UE 104 determines the new candidate UE beams. The updated set of candidate UE beams, for example, may not contain beams with particularly high P-MPR, such as where the P-MPR exceeds the threshold set at 502.

At 506, the TRP 102 triggers UL beam management in the UE 104. For example, the TRP may send an SRS transmission trigger 508 to the UE.

At 510, the UE transmits the SRS resources in the new set of candidate UE beams. That is, the UE performs the UL beam management procedure (e.g., U2 and/or U3).

Figure 6:
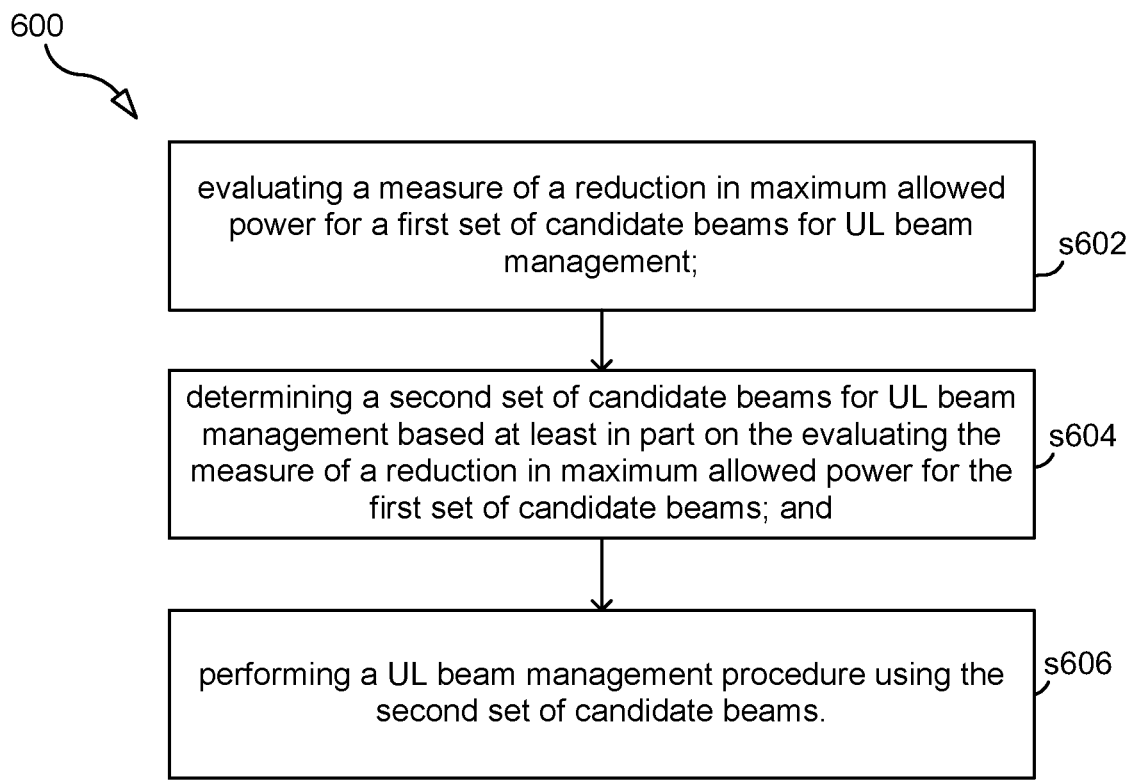
FIG. 6 is a flow chart according to an embodiment.

FIG. 6 illustrates a flow chart according to an embodiment. Process 600 is a method performed by a UE. Process 600 may begin with step s602

Step s602 comprises evaluating a measure of a reduction in maximum allowed power for a first set of candidate beams for UL beam management.

Step s604 comprises determining a second set of candidate beams for UL beam management based at least in part on the evaluating the measure of a reduction in maximum allowed power for the first set of candidate beams.

Step s606 comprises performing a UL beam management procedure using the second set of candidate beams.

In some embodiments, the UE includes a first antenna panel and a second antenna panel, and each beam in both the first and the second set of candidate beams corresponds to the first antenna panel. In other embodiments, the first antenna panel is analog, and may in some embodiments use analog phase shifters to steer the beam.

In some embodiments, evaluating the measure of a reduction in maximum allowed power for the first set of candidate beams comprises determining which candidate beams, if any, of the first set of candidate beams are directed toward a human operating the UE. In some embodiments, determining which candidate beams, if any, of the first set of candidate beams are directed toward a human operating the UE is based on one or more of a camera, an orientation and/or position of the UE, and a proximity sensor. In some embodiments, the evaluating the measure of a reduction in maximum allowed power for the first set of candidate beams comprises establishing an order of candidate beams of the first set of candidate beams with respect to the measure of a reduction in maximum allowed power, and the determining a second set of candidate beams for UL beam management comprises eliminating a first candidate beam from the first set of candidate beams based on the candidate beam having a higher measure of a reduction in maximum allowed power than other candidate beams based on the established order of candidate beams.

In some embodiments, the evaluating the measure of a reduction in maximum allowed power for the first set of candidate beams further comprises determining a scalar value representing the measure of a reduction in maximum allowed power for each candidate beam of the first set of candidate beams. In some embodiments, the determining a second set of candidate beams for UL beam management further comprises generating a maximum threshold value for the measure of a reduction in maximum allowed power based on estimating a Sounding Reference Signal (SRS) link budget. In some embodiments, the measure of a reduction in maximum allowed power comprises the Power Management Maximum Power Reduction (P-MPR) measure.

In some embodiments, the method further includes adding a second candidate beam to the second set of candidate beams in response to eliminating the first candidate beam, wherein the second candidate beam is different from each beam in the first set of candidate beams. In some embodiments, the method further includes adding a second candidate beam to the second set of candidate beams in response to eliminating the first candidate beam, wherein the second candidate beam is one of the candidate beams in the first set of candidate beams other than the first candidate beam.

In some embodiments, performing a UL beam management procedure using the second set of candidate beams comprises performing one of a U2 procedure and a U3 procedure. In some embodiments, performing a UL beam management procedure using the second set of candidate beams comprises transmitting Sounding Reference Signal (SRS) resources in the second set of candidate beams. In some embodiments, transmitting SRS resources in the second set of candidate beams comprises only one SRS resource per candidate beam in the second set of candidate beams.

Figure 7:
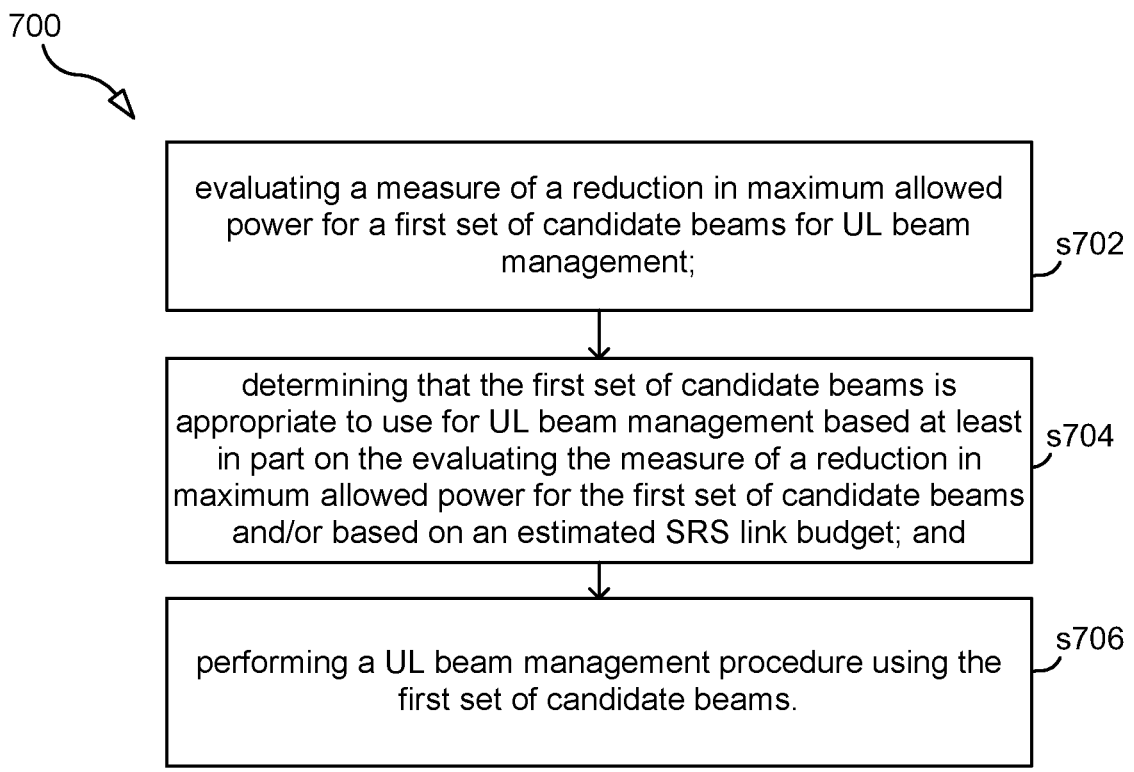
FIG. 7 is a flow chart according to an embodiment.

FIG. 7 illustrates a flow chart according to an embodiment. Process 700 is a method performed by a UE. Process 700 may begin with step s702.

Step s702 comprises evaluating a measure of a reduction in maximum allowed power for a first set of candidate beams for UL beam management;

Step s704 comprises determining that the first set of candidate beams is appropriate to use for UL beam management based at least in part on the evaluating the measure of a reduction in maximum allowed power for the first set of candidate beams and/or based on an estimated SRS link budget; and Step s706 comprises performing a UL beam management procedure using the first set of candidate beams.

In some embodiments, the measure of a reduction in maximum allowed power may be any such measure disclosed herein, including P-MPR, and evaluating the measure of a reduction in maximum allowed power may be performed according to any of the embodiments disclosed herein for evaluating the measure of maximum power. For example, as disclosed with respect to process 600, evaluating the measure of a reduction in maximum allowed power for the first set of candidate beams comprises determining which candidate beams, if any, of the first set of candidate beams are directed toward a human operating the UE.

Figure 8:
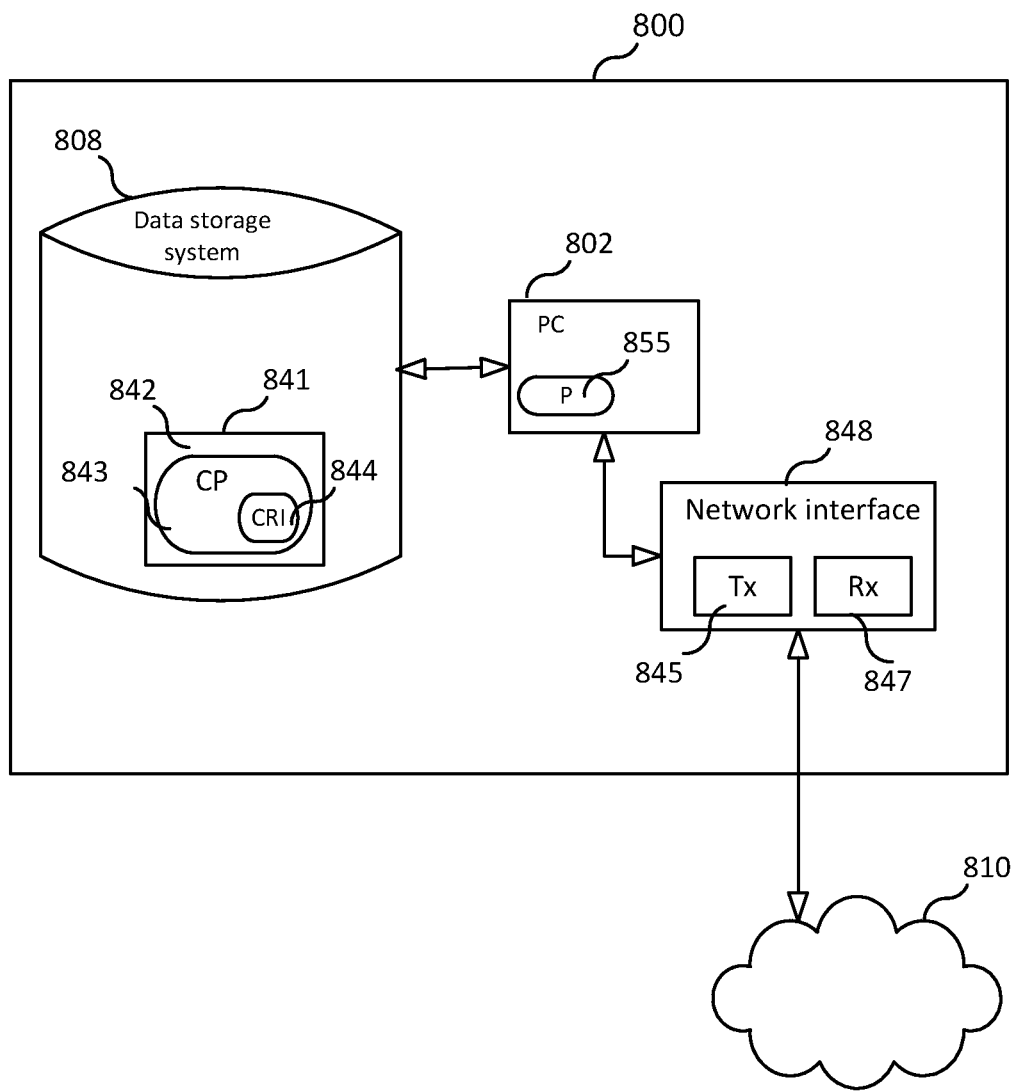
FIG. 8 is a block diagram of an apparatus according to an embodiment.

FIG. 8 is a block diagram of an apparatus 800 (e.g., a UE), according to some embodiments. As shown in FIG. 8, the apparatus may comprise: processing circuitry (PC) 802, which may include one or more processors (P) 855 (e.g., a general purpose microprocessor and/or one or more other processors, such as an application specific integrated circuit (ASIC), field-programmable gate arrays (FPGAs), and the like); a network interface 848 comprising a transmitter (Tx) 845 and a receiver (Rx) 847 for enabling the apparatus to transmit data to and receive data from other nodes connected to a network 810 (e.g., an Internet Protocol (IP) network) to which network interface 848 is connected; and a local storage unit (a.k.a., "data storage system") 808, which may include one or more non-volatile storage devices and/or one or more volatile storage devices. In embodiments where PC 802 includes a programmable processor, a computer program product (CPP) 841 may be provided. CPP 841 includes a computer readable medium (CRM) 842 storing a computer program (CP) 843 comprising computer readable instructions (CRI) 944. CRM 942 may be a non-transitory computer readable medium, such as, magnetic media (e.g., a hard disk), optical media, memory devices (e.g., random access memory, flash memory), and the like. In some embodiments, the CRI 844 of computer program 843 is configured such that when executed by PC 802, the CRI causes the apparatus to perform steps described herein (e.g., steps described herein with reference to the flow charts). In other embodiments, the apparatus may be configured to perform steps described herein without the need for code. That is, for example, PC 802 may consist merely of one or more ASICs. Hence, the features of the embodiments described herein may be implemented in hardware and/or software.

Apparatus 800 may further include one or more detectors, where evaluating a measure of a reduction in maximum allowed power comprises using measurements from at least one of the detectors. Detectors could include, for example, one or more cameras, audio or thermal sensors, RF sensors, GPS units, proximity detectors, and impedance measurement devices.

Figure 9:
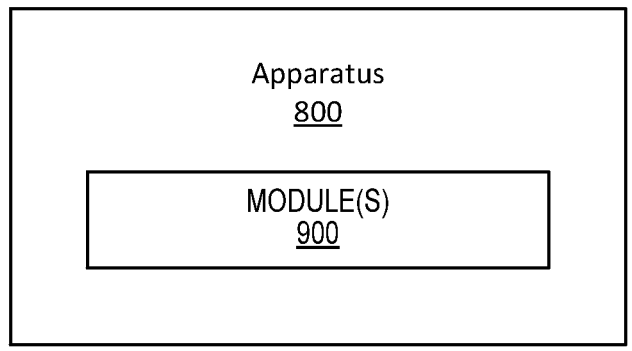
FIG. 9 is a block diagram of an apparatus according to an embodiment.

FIG. 9 is a schematic block diagram of the apparatus 800 according to some other embodiments. The apparatus 800 includes one or more modules 900, each of which is implemented in software. The module(s) 900 provide the functionality of apparatus 800 described herein (e.g., the steps herein, e.g., with respect to FIGS. 6-7).

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for assisting uplink (UL) beam management in a user equipment (UE), the method comprising:
    evaluating a measure of a reduction in maximum allowed power for a first set of candidate beams for UL beam management, the first set of candidate beams comprising a first beam and a second beam, wherein each beam included in the first set of beams is associated with the same antenna panel;
    determining a second set of candidate beams for UL beam management based at least in part on the evaluating the measure of a reduction in maximum allowed power for the first set of candidate beams; and
    performing a UL beam management procedure using the second set of candidate beams,
    wherein the second set of candidate beams includes the first beam but does not include the second beam.

2. The method of claim 1, wherein the UE includes a first antenna panel and a second antenna panel, and wherein each beam in both the first and the second set of candidate beams corresponds to the first antenna panel.

3. The method of claim 2, wherein the first antenna panel is analog.

4. The method of claim 1, wherein the evaluating the measure of a reduction in maximum allowed power for the first set of candidate beams comprises determining which candidate beams, if any, of the first set of candidate beams are directed toward a human operating the UE.

5. The method of claim 4, wherein determining which candidate beams, if any, of the first set of candidate beams are directed toward a human operating the UE is based on one or more of a camera, an orientation and/or position of the UE, and a proximity sensor.

6. The method of claim 1,
    wherein the evaluating the measure of a reduction in maximum allowed power for the first set of candidate beams comprises establishing an order of candidate beams of the first set of candidate beams with respect to the measure of a reduction in maximum allowed power, and wherein the determining a second set of candidate beams for UL beam management comprises eliminating a first candidate beam from the first set of candidate beams based on the candidate beam having a higher measure of a reduction in maximum allowed power than other candidate beams based on the established order of candidate beams.

7. The method of claim 6, wherein the evaluating the measure of a reduction in maximum allowed power for the first set of candidate beams further comprises determining a scalar value representing the measure of a reduction in maximum allowed power for each candidate beam of the first set of candidate beams.

8. The method of claim 7, wherein the determining a second set of candidate beams for UL beam management further comprises generating a maximum threshold value for the measure of a reduction in maximum allowed power based on estimating a Sounding Reference Signal (SRS) link budget.

9. The method of claim 7, wherein the measure of a reduction in maximum allowed power comprises the Power Management Maximum Power Reduction (P-MPR) measure.

10. The method of claim 6, further comprising adding a second candidate beam to the second set of candidate beams in response to eliminating the first candidate beam, wherein the second candidate beam is different from each beam in the first set of candidate beams.

11. The method of claim 6, further comprising adding a second candidate beam to the second set of candidate beams in response to eliminating the first candidate beam, wherein the second candidate beam is one of the candidate beams in the first set of candidate beams other than the first candidate beam.

12. The method of claim 1, wherein performing a UL beam management procedure using the second set of candidate beams comprises performing one of a U2 procedure and a U3 procedure.

13. The method of claim 1, wherein performing a UL beam management procedure using the second set of candidate beams comprises transmitting Sounding Reference Signal (SRS) resources in the second set of candidate beams.

14. The method of claim 13, wherein transmitting SRS resources in the second set of candidate beams comprises only one SRS resource per candidate beam in the second set of candidate beams.

15. The method of claim 5, wherein the UE further has a sensor, and the method further comprises determining, with the sensor, a set of directions that do not point toward the human operating the UE, and wherein determining a second set of candidate beams for UL beam management comprises selecting beams that do not point toward the human operating the UE.

16. The method of claim 1, wherein each beam in the second set of candidate beams has a low measure of a reduction in maximum allowed power relative to one or more beams that point toward a human operating the UE.

17. A method for assisting uplink (UL) beam management in a user equipment (UE), the method comprising:

for each beam included in a set of candidate beams, determining a power reduction metric for the beam, wherein the set of candidate beams includes a first beam and a second beam;

for each beam included in the set of candidate beams, determining whether the power reduction metric for the beam satisfies a condition indicating that the beam is inappropriate to use for UL beam management;

for each beam for which the beam's power reduction metric satisfies the condition, removing the beam from the set of candidate beams, thereby forming a new set of beams; and performing a UL beam management procedure using the new set of beams, wherein the new set of beam includes the first beam but does not include the second beam.

18. The method of claim 17, wherein the condition is further based at least in part on an estimated SRS link budget.

19. A user equipment (UE), the UE comprising:
a plurality of antennas;
a memory; and
a processor, wherein said processor is configured to:
evaluate a measure of a reduction in maximum allowed power for a first set of candidate beams for UL beam management, the first set of candidate beams comprising a first beam and a second beam, wherein each beam included in the first set of beams is associated with the same antenna panel;
determine a second set of candidate beams for UL beam management based at least in part on the evaluating the measure of a reduction in maximum allowed power for the first set of candidate beams; and
perform a UL beam management procedure using the second set of candidate beams wherein the second set of candidate beams includes the first beam but does not include the second beam.

20. The UE of claim 19, further comprising a first antenna panel and a second antenna panel, and wherein each beam in both the first and the second set of candidate beams corresponds to the first antenna panel.

21. The UE of claim 19, wherein first antenna panel is analog.

22. The UE of claim 19, wherein the evaluating the measure of a reduction in maximum allowed power for the first set of candidate beams comprises determining which candidate beams, if any, of the first set of candidate beams are directed toward a human operating the UE.

23. The UE of claim 22, wherein determining which candidate beams, if any, of the first set of candidate beams are directed toward a human operating the UE is based on one or more of a camera, an orientation and/or position of the UE, and a proximity sensor.

24. The UE of claim 19, wherein performing a UL beam management procedure using the second set of candidate beams comprises transmitting Sounding Reference Signal (SRS) resources in the second set of candidate beams.

25. A user equipment (UE), the UE comprising:
a plurality of antennas;
a memory; and
a processor, wherein said processor is configured to:
for each beam included in a set of candidate beams, determining a power reduction metric for the beam, wherein the set of candidate beams includes a first beam and a second beam;
for each beam included in the set of candidate beams, determine whether the power reduction metric for the beam satisfies a condition indicating that the beam is inappropriate to use for UL beam management;

for each beam for which the beam's power reduction metric satisfies the condition, removing the beam from the set of candidate beams, thereby forming a new set of beams; and perform a UL beam management procedure using the new set of beams, wherein the new set of beam includes the first beam but does not include the second beam.

* * * * *

UNITED STATES PATENT AND TRADEMARK OFFICE
CERTIFICATE OF CORRECTION

PATENT NO. : 11,133,855 B2
APPLICATION NO. : 16/557272
DATED : September 28, 2021
INVENTOR(S) : Andreas Nilsson Page 1 of 1

It is certified that error appears in the above-identified patent and that said Letters Patent is hereby corrected as shown below:

In the Specification

In Column 1, Line 22, delete "UE 106" and insert -- UE 104 --, therefor.

In Column 10, Line 37, delete "UE 102" and insert -- UE 104 --, therefor.

In Column 10, Line 56, delete "censors," and insert -- sensors, --, therefor.

In Column 11, Line 51, delete "censors," and insert -- sensors, --, therefor.

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*